(12) United States Patent
Scholl

(10) Patent No.: US 7,854,462 B2
(45) Date of Patent: Dec. 21, 2010

(54) FOLDING HEAD RESTRAINT

(75) Inventor: John Scholl, Farmington Hills, MI (US)

(73) Assignee: Intier Automotive Inc., Newmarket (CA)

( * ) Notice: Subject to any disclaimer, the term of this patent is extended or adjusted under 35 U.S.C. 154(b) by 251 days.

(21) Appl. No.: 12/294,522

(22) PCT Filed: Apr. 2, 2007

(86) PCT No.: PCT/CA2007/000533

§ 371 (c)(1),
(2), (4) Date: Sep. 25, 2008

(87) PCT Pub. No.: WO2007/112568

PCT Pub. Date: Oct. 11, 2007

(65) Prior Publication Data

US 2010/0230986 A1    Sep. 16, 2010

(51) Int. Cl.
*B60N 2/02* (2006.01)
(52) U.S. Cl. .................. 296/65.09; 296/65.05
(58) Field of Classification Search ........... 296/65.09, 296/65.01, 65.05; 248/429, 425, 430; 297/341
See application file for complete search history.

(56) References Cited

U.S. PATENT DOCUMENTS

| | | | |
|---|---|---|---|
| 4,364,602 A * | 12/1982 | Rigazio | 297/334 |
| 5,681,077 A * | 10/1997 | Hashimoto | 296/65.05 |
| 5,681,079 A | 10/1997 | Robinson | |
| 5,738,411 A | 4/1998 | Sutton et al. | |
| 5,826,942 A * | 10/1998 | Sutton et al. | 297/378.12 |
| 6,860,564 B2 * | 3/2005 | Reed et al. | 297/408 |
| 7,044,555 B2 | 5/2006 | Saberan | |
| 7,344,189 B2 * | 3/2008 | Reed et al. | 297/61 |
| 2005/0067874 A1 | 3/2005 | Kamrath et al. | |
| 2005/0073180 A1 | 4/2005 | Reed et al. | |
| 2005/0156456 A1 | 7/2005 | Robinson et al. | |
| 2006/0022498 A1 | 2/2006 | Freijy | |
| 2008/0224520 A1 * | 9/2008 | Veluswamy et al. | 297/335 |
| 2009/0152888 A1 * | 6/2009 | Zelmanov et al. | 296/65.09 |
| 2010/0052391 A1 * | 3/2010 | Hurst et al. | 297/341 |
| 2010/0141004 A1 * | 6/2010 | Zeimis et al. | 297/336 |

FOREIGN PATENT DOCUMENTS

| | | |
|---|---|---|
| EP | 1 316 471 B1 | 6/2003 |
| GB | 2337925 A | 12/1999 |
| WO | WO 02/20306 A1 | 3/2002 |
| WO | WO 2006/128290 A1 | 12/2006 |

* cited by examiner

Primary Examiner—Kiran B. Patel
(74) Attorney, Agent, or Firm—Clarkhill, PLC

(57) ABSTRACT

A seat assembly is provided that has a head restraint pivotally mounted to the seat back for movement between an operative position and a stowed position. The seat assembly has a seat mounting assembly that comprises at least one floor latch assembly. The floor latch assembly is operable between a latched position locking the seat assembly to the floor and a released position allowing the pivotal movement of the seat assembly to a folded position. The floor latch assembly is operatively coupled to the head restraint to release the head restraint from the operative position when the floor latch assembly is in the released position and prevent the head restraint from being locked in the operative position until the floor latch assembly is back in the latched position.

13 Claims, 5 Drawing Sheets

FOLDING HEAD RESTRAINT

FIELD OF THE INVENTION

The invention relates to a seat assembly for an automotive vehicle. More particularly, the invention relates to a seat assembly including a head restraint that cannot be locked in an operative position unless the seat assembly is secured to the vehicle floor.

DESCRIPTION OF RELATED ART

Automotive vehicles include seat assemblies for supporting an occupant within the vehicle. The seat assemblies include a generally horizontal seat cushion and a seat back pivotally mounted to the seat cushion by a recliner mechanism. It is know in the seating art to provide a stowable seat assembly moveable between a seating position for supporting occupants above a floor of the vehicle and a stowed position lying flat against the floor, or nested within a recess formed in the floor. It is also known in the seating art to provide a stowable seat assembly moveable between the seating position and a stand-up position, forward and upward of the seating position, for allowing better access or increasing cargo space to an area behind the seat assembly.

Generally, seat assemblies of the stowable variety are pivotally coupled about a forward end and releasably coupled about a rearward end to the floor. Typically, floor latches are used to selectively lock the seat assemblies in the seating position by engaging striker bars fixedly secured to the floor. The floor latches are disengaged from the striker bars to pivot the seat assemblies to the stowed position. When the seat assembly is returned to the seating position, the floor latches re-engage the striker bars thereby locking the seat assembly in the seating position. Occasionally, the seat assembly is not properly or fully returned to the seating position such that the floor latches do not properly or fully re-engage the striker bars. Consequently, it is desirable to provide a mechanism that indicates whether the seat assembly, and more specifically, the floor latches are fully latched to the striker bars.

SUMMARY OF THE INVENTION

According to one aspect of the invention, a seat assembly is provided for supporting an occupant above a floor in an automotive vehicle. The seat assembly includes a seat cushion and a seat back pivotally mounted to the seat cushion. The seat back is selectively pivotable between a range of seat back positions. The seat assembly also includes a head restraint pivotally mounted to the seat back for movement between an operative position extending generally longitudinally with the seat back and a stowed position pivotal relative to the operative position. The head restraint includes a spring biasing the head restraint to the stowed position. The seat assembly further includes a seat mounting assembly for attaching the seat assembly to the floor and enabling selective pivotal movement of the seat cushion. The seat mounting assembly engages an underside of the seat cushion and comprises at least one floor latch assembly. The floor latch assembly is operable between a latched position locking the seat assembly to the floor and a released position allowing the pivotal movement of the seat assembly to a folded position. The floor latch assembly is operatively coupled to the head restraint to release the head restraint from the operative position when the floor latch assembly is in the released position.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
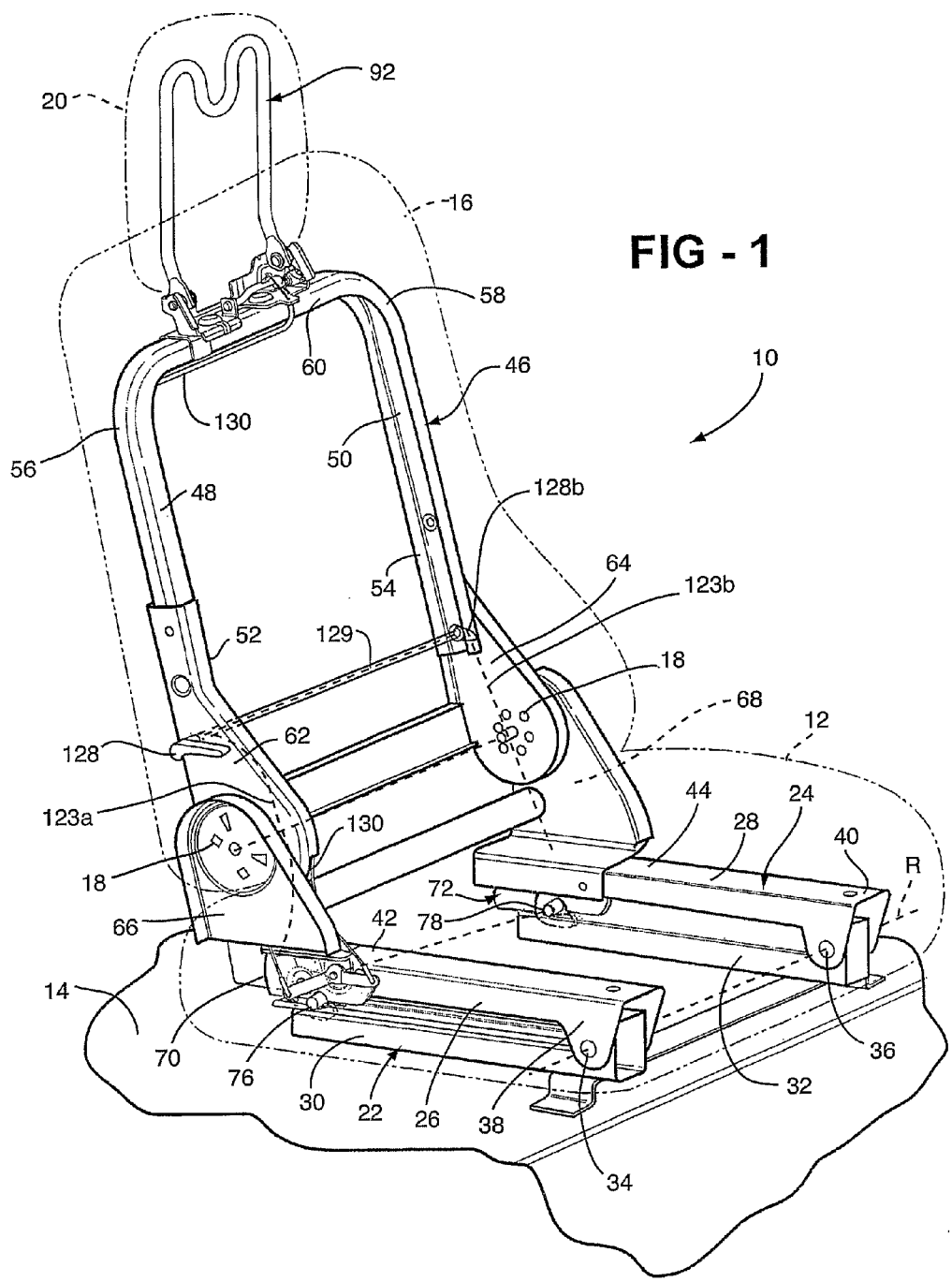
FIG. 1 is a perspective view of a seat assembly in a seating position according to the preferred embodiment of the invention.
Figure 2:
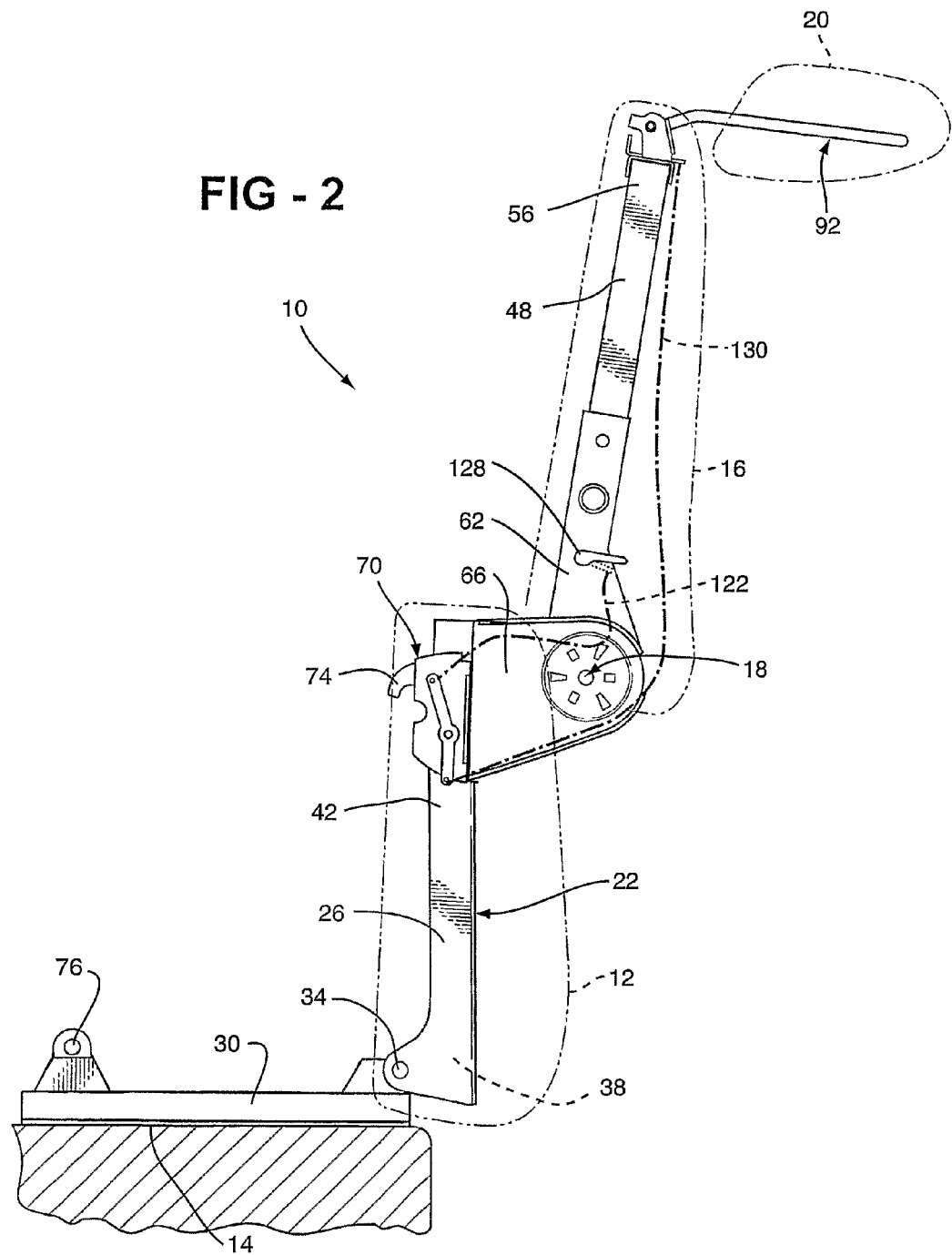
FIG. 2 is a side view of the seat assembly in a stand-up position.

Referring to FIGS. 1 and 2, a seat assembly for an automotive vehicle is generally shown at 10. The seat assembly 10 includes a seat cushion 12 for supporting a seat occupant above a floor 14 in the vehicle. The seat assembly 10 also includes a seat back 16 pivotally mounted to the seat cushion 12 and moveable between a first upright position, shown in FIG. 1, and a second upright position, shown in FIG. 2, forward and upward of the first upright position.

The seat back 16 is pivotally mounted to the seat cushion 12 by a pair of recliner mechanisms 18, as is commonly known in the art, for providing pivotal movement of the seat back 16 between the first upright position and the second upright position. The recliner mechanisms 18 may also provide fore and aft pivotal reclining adjustment of the seat back 16 relative to the seat cushion 12 for occupant comfort. An example of a dual disc recliner assembly is described in U.S. Pat. No. 6,712,429.

The seat assembly 10 is moveable between a seating position, as shown in FIG. 1, wherein the seat back 16 is in the first upright position and the seat cushion 12 is generally horizontal relative to the floor 14, and a stand-up or stowed position, as shown in FIG. 2, wherein the seat back 16 is pivoted to the second upright position and the seat cushion 12 is generally vertical relative to the floor 14.

The seat assembly 10 also includes a head restraint 20 operatively mounted to the seat back 16 and moveable between an operative or upright position, extending longitudinally with the seat back 16 as shown in FIG. 1, and a stowed or forwardly folded position, generally perpendicular to the seat back 16 as shown in FIG. 2.

The seat cushion 12 includes a contoured foam pad (not shown) encased by a trim cover (not shown), supported by a seat-pan (not shown). The seat-pan is fixedly secured to a pair of opposing and laterally spaced apart seat mounting assemblies, generally indicated at 22, 24. The seat mounting assemblies 22, 24 mount the seat assembly 10 to the floor 14 of the vehicle. The seat mounting assemblies 22, 24 include side members 26, 28 that are pivotally mounted to track mechanisms 30, 32 at pivots 34, 36, respectively, defining a transverse axis R about which the seat cushion 12 pivots. The side members 26, 28 extend between forward ends 38, 40 and rearward ends 42, 44, respectively. The track mechanisms 30, 32 are well known in the art and provide fore and aft sliding adjustment of the seat assembly 10. It will be appreciated that the side members 26, 28 could be pivotally coupled directly to the floor 14 without varying from the scope of the invention. The pivots 34, 36 are provided for moving the seat cushion 12 between the seating position and the stand-up or stored position.

The seat back 16 includes a rigid seat back frame, generally indicated at 46. The seat back frame 46 supports a contoured foam pad (not shown) encased by a trim cover (not shown). The seat back frame 46 includes a pair of opposing and laterally spaced apart side members 48, 50 extending between lower ends 52, 54 and upper ends 56, 58, respectively. A cross member 60 extends between the upper ends 56, 58 of the side members 48, 50. The lower ends 52, 54 of the side members 48, 50 are fixedly secured to seat back brackets 62, 64, respectively. The seat back brackets 62, 64 are pivotally coupled via the recliner mechanisms 18 to seat cushion brackets 66, 68. The seat cushion brackets 66, 68 are fixedly secured to the rearward ends 42, 44 of the side members 26, 28.

Figure 3:
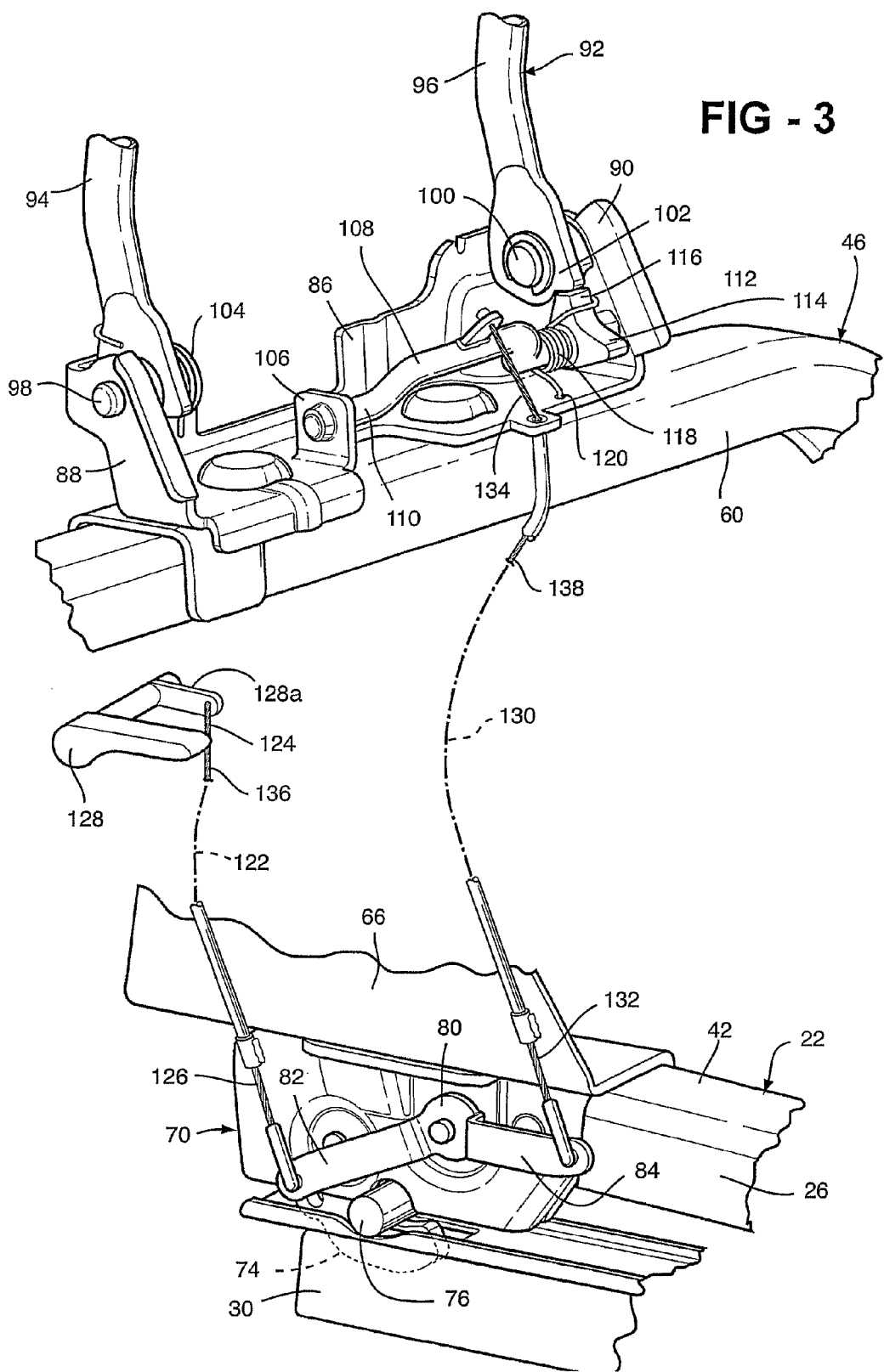
FIG. 3 is an enlarged fragmentary, perspective view of a floor latch assembly in a latched position and a head restraint in an operative position.
Figure 4:
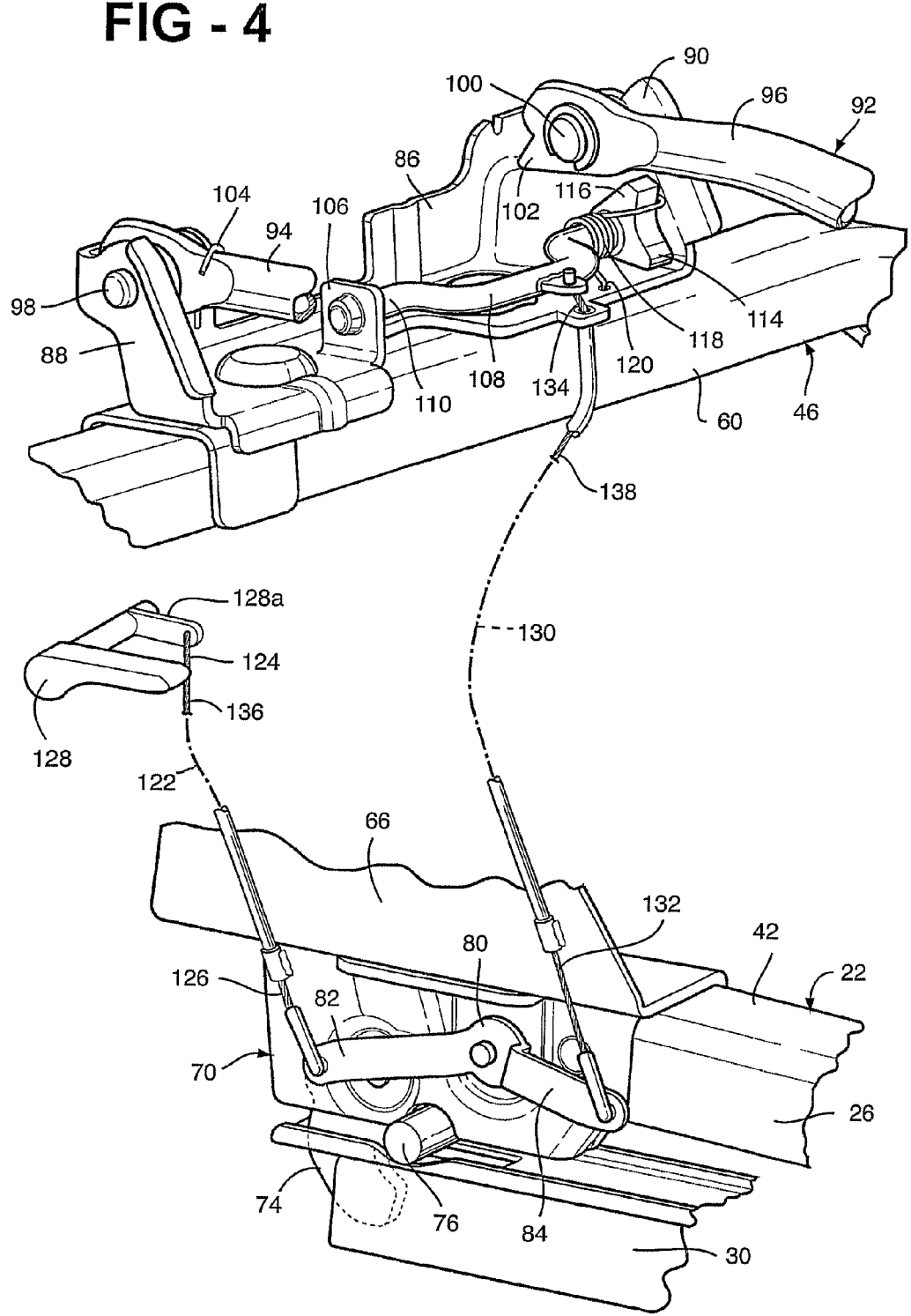
FIG. 4 is an enlarged fragmentary, perspective view of the floor latch assembly in a released position and the head restraint in a stowed position.

Referring to FIGS. 3 and 4, the seat mounting assemblies 22, 24 also include a pair of floor latch assemblies, generally indicated at 70, 72. The floor latch assemblies 70, 72 are provided for selectively locking the seat cushion 12 in the seating position. The floor latch assemblies 70, 72 are fixedly secured to the rearward ends 42, 44 of the side members 26, 28. Each floor latch assembly 70, 72 includes a latch plate 74 pivotally coupled thereto. The latch plate 74 pivots between a latched position, shown in FIG. 3, wherein the floor latch assemblies 70, 72 engage striker bars 76, 78 fixedly secured to the track mechanisms 30, 32 and a released position, shown in FIG. 4, wherein the floor latch assemblies 70, 72 are disengaged from the striker bars 76, 78. An example of a known floor latch assembly is described in U.S. Pat. No. 6,820,912.

Each floor latch assembly 70, 72 also includes a latch lever 80 pivotally coupled thereto. The latch lever 80 extends between a first end or latch release link 82 and a second end or head restraint release link 84. Pivoting the latch lever 80 of each of the respective floor latch assemblies 70, 72 actuates the respective latch plate 74 between the latched and released positions. The latch levers 80 are operatively coupled together such that pivoting the latch lever 80 of the floor latch assembly 70 shown in FIG. 3 will result in the latch levers 80 of both of the floor latch assemblies 70, 72 pivoting together, thereby actuating the latch plates 74 simultaneously. More specifically each latch lever 80 of each respective floor latch assemblies 70, 72 may be pivoted simultaneously when actuated by a pair of cables or a synchronizing rod as commonly know to those skilled in the art.

The head restraint 20 includes a base bracket 86 adapted to be fixedly secured to the cross member 60 of the seat back frame 46. The base bracket 86 includes laterally spaced apart first 88 and second 90 upright supports. The head restraint 20 also includes an armature, generally indicated at 92. The armature 92 includes laterally spaced apart first 94 and second 96 legs. The first leg 94 is pivotally coupled to the first upright support 88 at pivot 98 and the second leg 96 is pivotally coupled to the second upright support 90 at pivot 100. The second leg 96 includes an integral sector 102 at pivot 100. A first torsion spring 104 extends between the first leg 94 and the first upright support 88 biasing the head restraint 20 to the stowed position.

The base bracket 86 also includes an upright tab 106 disposed between the first 88 and second 90 upright supports. A release arm 108 includes a first end 110 and a second end 112. The release arm 108 is rotatably coupled at the first end 110 to the upright tab 106 and at the second end 112 to the second upright support 90. A locking cam 114 is disposed at the second end 112 of the release arm 108 such that the locking cam 114 rotates with the release arm 108. More specifically, the release arm 108 rotates between an initial position, shown in FIG. 3, wherein a lobe 116 of the locking cam 114 is upright to engage the sector 102 and a rotated position, shown in FIG. 4, wherein the lobe 116 is downward to prevent engagement with the sector 102. A second torsion spring 118 extends between the lobe 116 of the locking cam 114 and a hole 120 in the base bracket 86 biasing the release arm 108 to the initial position.

A release assembly includes a release handle 128, a pair of release levers 128a, 128b and cross rod 129. Cross rod 129 extends between side frame members 48, 50 and is fixedly secured to handle 128 and release levers 128a and 128b allowing ganged pivotally movement of release levers 128a and 128b in response to pivotal movement of release handle 128. The release assembly further includes a recliner release link (not shown) for responsively locking and unlocking both recliner mechanisms 18. Alternatively, recliner mechanisms could be ganged together as known to one commonly skilled in the art, in particular, U.S. Pat. No. 6,712,429.

A first Bowden-type cable assembly 122 includes a pair of cables 123a and 123b. Each cable 123a and 123b extends between a first end 124 and a second end 126. Each first end 124 is operatively coupled to the release handle assembly. The second end 126 is operatively coupled to the latch release link 82 of each respective floor latch assembly 70, 72. A second Bowden-type cable assembly 130 extends between a first end 132 and a second end 134. The first end 132 is operatively coupled to the head restraint release link 84 of floor latch assembly 70. The second end 134 is operatively coupled to the release arm 108 between the first 110 and second 112 ends.

In operation, the seat assembly 10 is normally in the seating position with the head restraint 20 releasably locked in the operative position, as shown in FIG. 1. More specifically, the latch plates 74 are in the latched position such that the floor latch assemblies 70, 72 are engaged with the striker bars 76, 78, thereby locking the seat assembly 10 in the seating position. Additionally, the release arm 108 is in the initial position such that the lobe 116 of the locking cam 114 is upright engaging the sector 102, thereby locking the head restraint 20 in the operative position.

When it is desired to have access to an area behind the seat assembly 10, an occupant actuates the release handle 128. Actuating the release handle assembly pulls an inner cable 136 of the first cable assembly 122 such that the latch release links 82 move upward. The upward movement of latch release links 82 pivots the latch levers 80 in a clockwise direction (when viewed from FIG. 3), thereby releasing the latch plates 74 so that each rotates to the released position, shown in FIG. 4. With the latch plates 74 in the released position, the floor latch assemblies 70, 72 disengage from the striker bars 76, 78. At the same time that the latch levers 80 pivot in the clockwise direction, the head restraint release link 84 moves downward. The downward movement of the head restraint release link 84 pulls an inner cable 138 of the second cable assembly 130 such that the release arm 108 rotates downward to the rotated position. With the release arm 108 in the rotated position, the lobe 116 of the locking cam 114 is downward preventing engagement with the sector 102, and the first torsion spring 104 urges the head restraint 20 to the stowed position. Either cooperatively with the movement of the release handle 128 or independently, the recliners 18 are released to allow pivotal movement of the seat back 16 relative to the seat cushion 12 enabling the seat assembly 10 can now be moved to the stand-up position.

When the seat assembly 10 is returned to the seating position the floor latch assemblies 70, 72 re-engage the striker bars 76, 78 thereby actuating the latch plates 74 to the latched position, which in turn causes the latch lever 80 to pivot in the counterclockwise direction (when viewed from FIG. 4). The counterclockwise movement of the latch lever 80 results in the latch release link 82 moving downward. The downward movement of the latch release link 82 pulls the inner cable 136 of the first cable assembly 122 such that the release handle assembly pivots back to its initial position. At the same time that the latch lever 80 pivots in the counterclockwise direction, the head restraint release link 84 moves upward. The upward movement of the head restraint release link 84 releases the inner cable 138 of the second cable assembly 130 such that the second torsion spring 118 biases the release arm 108 back to the initial position. With the release arm 108 in the initial position, the lobe 116 of the locking cam 114 is upright. The head restraint 20 can now be moved to the operative position by rotating it about pivots 98, 100 until the sector 102 re-engages the lobe 116.

If the seat assembly 10 is not properly or fully returned to the seating position and the floor latch assemblies 70, 72 are not fully re-engaged to the striker bars 76, 78, the head restraint 20 cannot be locked in the operative position. More specifically, if the floor latches 70, 72 do not properly or fully re-engage the striker bars 76, 78, the latch plates 74 remain in the released position and thus, the latch lever 80 does not pivot in the counterclockwise direction. Since the latch lever 80 does not pivot in the counterclockwise direction, the latch release link 82 does not pull the inner cable 136 of the first cable assembly 122 to pivot the release handle 128 to its initial position. Further, the head restraint release link 84 does not release the inner cable 138 of the second cable assembly 130 to allow the second torsion spring 118 to bias the release arm 108 back to the initial position. With the release arm 108 still in the rotated position, the lobe 116 of the locking cam 114 is downward preventing engagement with the sector 102. Thus, if the head restraint 20 is moved to the operative position, the sector 102 does not re-engage the lobe 116 of the locking cam 114 and the first torsion spring 104 will bias the head restraint 20 back to the stowed position. This inability to lock the head restraint 20 in the operative position indicates that the seat assembly 10, and more specifically, the floor latches 70, 72, are not properly or fully latched to the striker bars 76, 78.

The invention may be utilized with any seat assembly 10 that is releasably coupled to the floor 14 of the vehicle.

Figure 5:
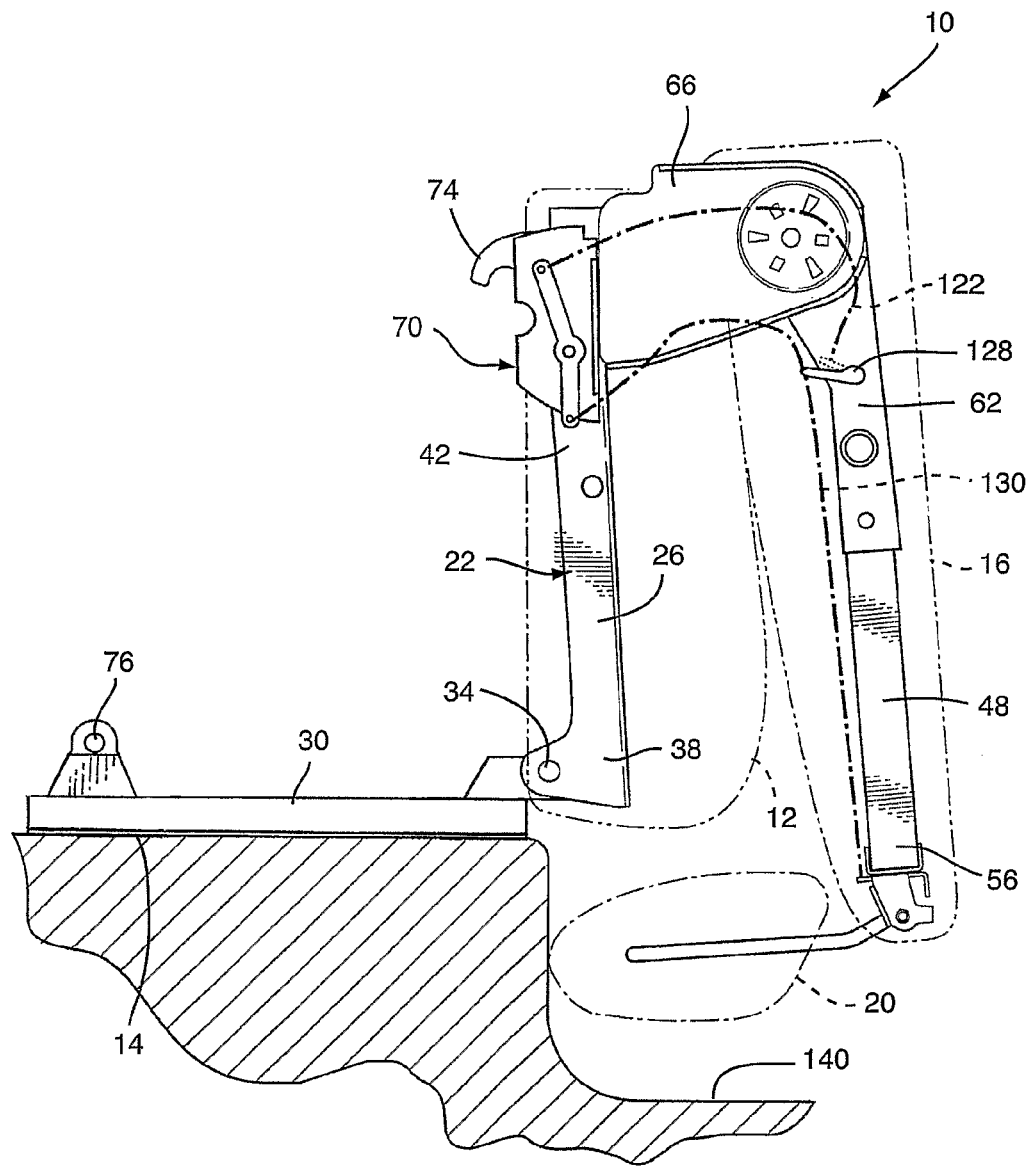
FIG. 5 is a side view of the seat assembly in a fold and tumble position.

Referring to FIG. 5, in an alternative embodiment, the folded position is a fold and tumble or stowed position wherein the seat cushion 12 is generally vertical relative to the floor 14 and the seat back 16 is folded flat, overlying the seat cushion 12. Additionally, the seat assembly 10 shown in FIG. 5 may be operable such that it will move from the seating position to a position lying flat against the floor 14, or nested within a recess 140 formed in the floor 14. As described above, if the seat assembly 10 is not properly or fully returned to the seating position, the head restraint 20 cannot be locked in the operative position.

It is further contemplated that stowable seat assemblies may be pivotally coupled about an axis located at a rearward end and releasably coupled about a forward end to the floor without detracting from the scope of the invention.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A seat assembly for supporting an occupant above a floor in an automotive vehicle, said seat assembly comprising:
    a seat cushion;
    a seat back pivotally mounted to said seat cushion and selectively pivotable between a range of seat back positions and a first stowed position;
    a head restraint pivotally mounted to said seat back for movement between an operative position extending generally longitudinally with said seat back and a second stowed position pivoted relative to said operative position, said head restraint having a spring biasing said head restraint to said second stowed position; and
    a seat mounting assembly for attaching said seat assembly to the floor and enabling selective pivotal movement of said seat cushion, said seat mounting assembly engaging an underside of said seat cushion and comprising at least one floor latch assembly and a pivot, said floor latch assembly operable between a latched position locking said seat assembly to the floor and a released position allowing pivotal movement of said seat assembly about said pivot to a folded position, and wherein said floor latch assembly is operatively coupled to said head restraint to release said head restraint from said operative position when said floor latch assembly is in said released position and prevent said head restraint from being locked in the operative position until said floor latch assembly is in the latched position.

2. A seat assembly as set forth in claim 1 wherein said seat assembly further comprises a release handle pivotally mounted on said seat back and operatively connected to said floor latch assembly.

3. A seat assembly as set forth in claim 2, wherein said seat assembly further comprises a release arm pivotally mounted to said seat back, said release arm pivots between an initial position retaining said head restraint in said operative position and a rotated position allowing said head restraint to move to said stowed position, said release arm being operatively connected to said floor latch assembly.

4. A seat assembly as set forth in claim 3, wherein said floor latch assembly has a latch lever having a first end operatively connecting said release handle and a second end operatively connecting said release arm.

5. A seat assembly as set forth in claim 4, wherein said release arm has a locking cam configured to engage with a sector mounted on said head restraint, said release arm having a spring biasing said locking cam into engagement with said sector.

6. A seat assembly as set forth in claim 4, wherein pivoting of said latch lever actuates said floor latch assembly to release a latch plate and allow said latch plate to rotate in an unlatching sense, said latch plate engaging said latch lever preventing counter-pivoting of said latch lever until said latch plate is fully counter-rotated in a latching sense, opposite said unlatching sense, placing said floor latch assembly in the latch position.

7. A seat assembly as set forth in claim 4, wherein each of said operative connections is a Bowden wire.

8. A seat assembly as set forth in claim 4, wherein said seat mounting assembly comprises a pair of side members, each side member having said pivot and one of said at least one floor latch assembly.

9. A seat assembly as set forth in claim 8, wherein each of said at least one floor latch is operatively connected to said release handle for ganged operation therewith.

10. A seat assembly as set forth in claim 9, wherein said release arm has a locking cam configured to engage with a sector mounted on said head restraint, said release arm having a spring biasing said locking cam into engagement with said sector.

11. A seat assembly as set forth in claim 10, wherein pivoting of said latch levers actuates a respective one of said at least one floor latch assembly to release a latch plate and allow said latch plate to rotate in an unlatching sense, said latch plate engaging said latch lever preventing counter-pivoting of said latch lever until said latch plate is fully counter-rotated in a latch sense, opposite said unlatching sense, placing said floor latch assembly in the latch position.

12. A seat assembly as set forth in claim 11, wherein said seat assembly further comprises a pair of track mechanisms configured for mounting on the floor, each of said track mechanisms engaging said pivot and having a striker bar for engaging with one of said at least one floor latch assembly.

13. A seat assembly as set forth in claim 12, wherein each of said operative connections is a Bowden wire.

* * * * *